United States Patent [19]
Yang

[11] Patent Number: 5,412,838
[45] Date of Patent: May 9, 1995

[54] CASTER FOR BAGGAGE

[76] Inventor: I-Min Yang, No. 358, Sec. 1, Chang Hsi Road, Tainan, Taiwan, Prov. of China

[21] Appl. No.: 159,530

[22] Filed: Dec. 1, 1993

[51] Int. Cl.⁶ .............................................. B60B 33/08
[52] U.S. Cl. ....................................................... 16/26
[58] Field of Search .......................... 16/26, 21, 24, 25

[56] References Cited

U.S. PATENT DOCUMENTS

| | | | |
|---|---|---|---|
| 667,545 | 2/1901 | Medley | 16/25 |
| 2,687,546 | 8/1954 | Oppenheimer | 16/26 |
| 3,399,421 | 9/1968 | Crawford | 16/26 |
| 3,739,894 | 6/1973 | Hinman | 16/26 |
| 4,203,177 | 5/1980 | Kegg et al. | 16/24 |
| 4,696,583 | 9/1987 | Gorges | 16/26 |

*Primary Examiner*—P. Austin Bradley
*Assistant Examiner*—Chuck Y. Mah
*Attorney, Agent, or Firm*—Morton J. Rosenberg; David I. Klein

[57] ABSTRACT

A caster for baggage is provided which includes a lower fixing plate fixed firmly to an upper fixing plate to contain a ball, a shaft, a bearing and a ring therebetween. The ball is pivotally supported on the shaft, and the shaft is supported by the bearing. The bearing has a plurality of small balls disposed on an upper surface, and a ring fits on the small balls and also fits in an annular groove formed in a bottom surface of the upper fixing plate. This arrangement enables the bearing and the ball to rotate horizontally relative to the upper and lower fixing plates. The caster can move smoothly on the ground after it is fixed to a bottom surface of a piece of baggage.

1 Claim, 4 Drawing Sheets

CASTER FOR BAGGAGE

BACKGROUND OF THE INVENTION

A conventional caster for baggage shown in FIGS. 6 and 7 includes a U-shaped fixing plate 11, an upper plate 12 disposed under and coupled to the fixing plate 11, and a ball bearing 13 fixed under the upper plate 12 by the shaft of a pin 15. An inverted U-shaped hanger which pivotally supports a roller 16 is also fixed to the ball bearing 13 by the pin 15. The fixing plate 11 is secured under a bottom side of a piece of baggage, with the roller 16 standing on the ground to aid the baggage in moving around on the ground.

The conventional caster is found to have the following disadvantages:

1. It does not protrude downward for a large distance, as it is usually made in very small size, and is liable to let a piece of baggage incline or fall down when moved on the ground that is not even or has holes; and,
2. It does not move smoothly on the ground if the baggage is heavily loaded, and is easily damaged.

SUMMARY OF THE INVENTION

This invention has been devised to offer a caster for use on baggage, making it possible to move the baggage smoothly, turn through 360 degrees and to endure a large load.

The caster of the present invention includes a lower fixing plate, an upper fixing plate secured to the lower fixing plate and to a bottom side of a piece of baggage, a ball to stand on the ground pivotally supported by a shaft passing horizontally through the ball, and a bearing having two opposing notches formed in a bottom side thereof for respectively receiving both ends of the shaft therein. The bearing includes a plurality of small balls disposed on an upper surface thereof, and a curved ring overlying the small balls and fitting into an annular groove formed in a bottom surface of the upper fixing plate. The bearing, the shaft, the ball and the ring are disposed between the upper and the lower fixing plate so that the ball protrudes downward through a central opening of the lower fixing plate to stand and move on the ground with the shaft as a pivot. The ball and its pivot rotate horizontally relative to the fixing plates.

BRIEF DESCRIPTION OF THE DRAWINGS

The invention will be better understood by reference to the accompanying drawings, wherein.

DESCRIPTION OF THE PREFERRED EMBODIMENTS

Figure 1:
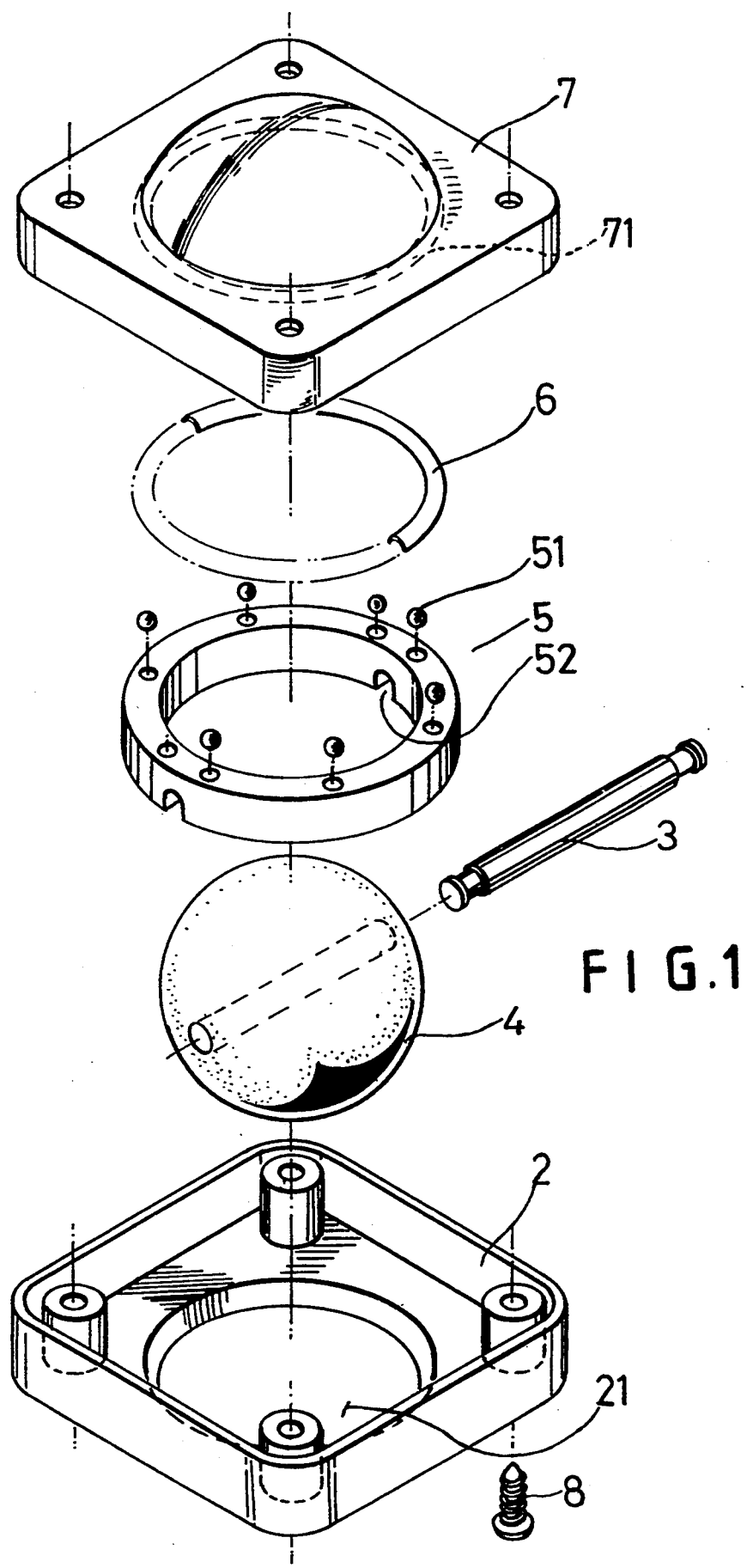
FIG. 1 is an exploded perspective view of a caster for baggage of the present invention.

A caster in the present invention, as shown in FIG. 1, includes a lower fixing plate 2, a shaft 3, a ball 4, a bearing 5, a ring 6 and an upper fixing plate 7 combined together.

The lower fixing plate 2 has a round opening formed through the bottom surface thereof for the ball 4 to protrude downward therethrough. About one third of the diameter of the ball 4 protrudes through the opening to rest on the ground.

The bearing 5 is shaped as an annular ring, having a plurality of small rolling balls 51 projecting from semispherical recesses formed in an upper surface of the bearing 5, and two notches 52, 52, formed in opposing sides of the bottom surface of bearing 5 for receipt of the two ends of the shaft 3. The ends of shaft 3 are pivotally retained within the notches 52 and an upper surface of the lower fixing plate, thereby retaining the ball 4.

The metal ring 6 has a semi-circular cross-sectional contour, so as to provide a contact surface for the small balls 51 of the bearing 5. The ring 6 fits into an annular groove 71 formed in the upper fixing plate 7, so as to enable the bearing 5 to rotate horizontally relative to the upper and lower fixing plates 7, 2.

The upper fixing plate 7 has the same shape as the lower fixing plate 2. The lower fixing plate 2 covers the upper fixing plate 7 and they are screwed firmly together with screws 8, and contain the ring 6, the bearing 5 and the shaft 3 therebetween.

Figure 2:
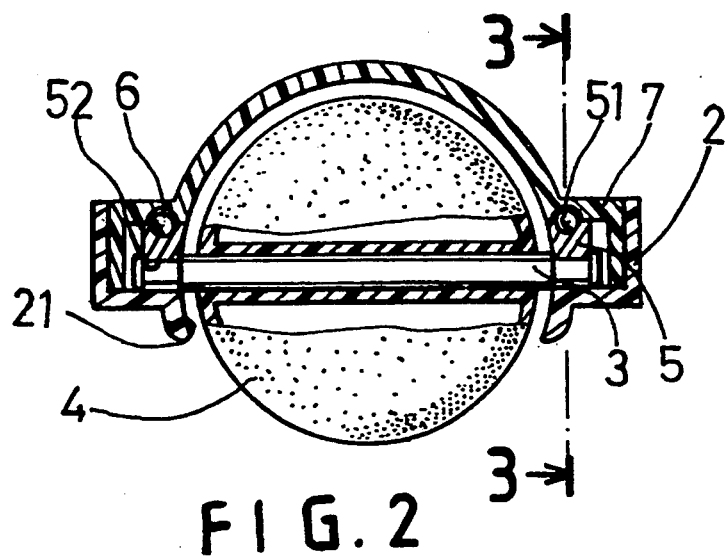
FIG. 2 is a cross-sectional view of the caster for baggage of the present invention.
Figure 3:
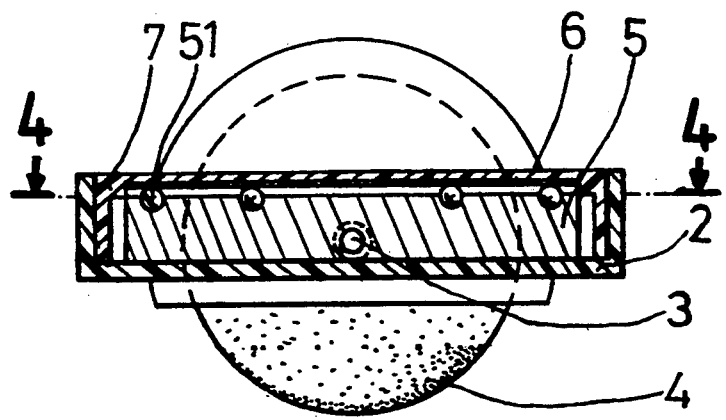
FIG. 3 is a cross-sectional view taken along the Section Line 3—3 of FIG. 2.
Figure 4:
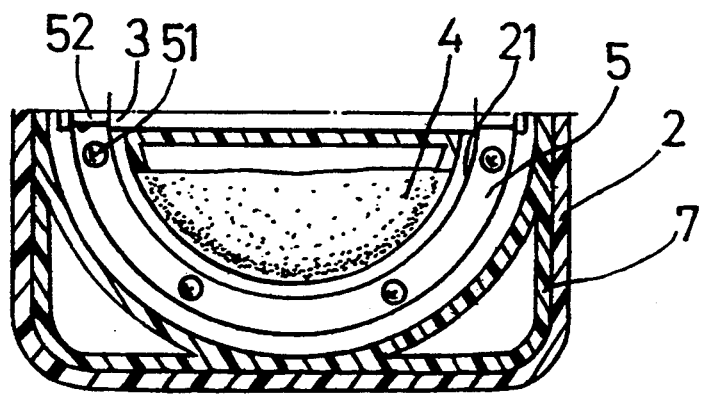
FIG. 4 is a cross-sectional view taken along the Section Line 4—4 of FIG. 3.
Figure 5:
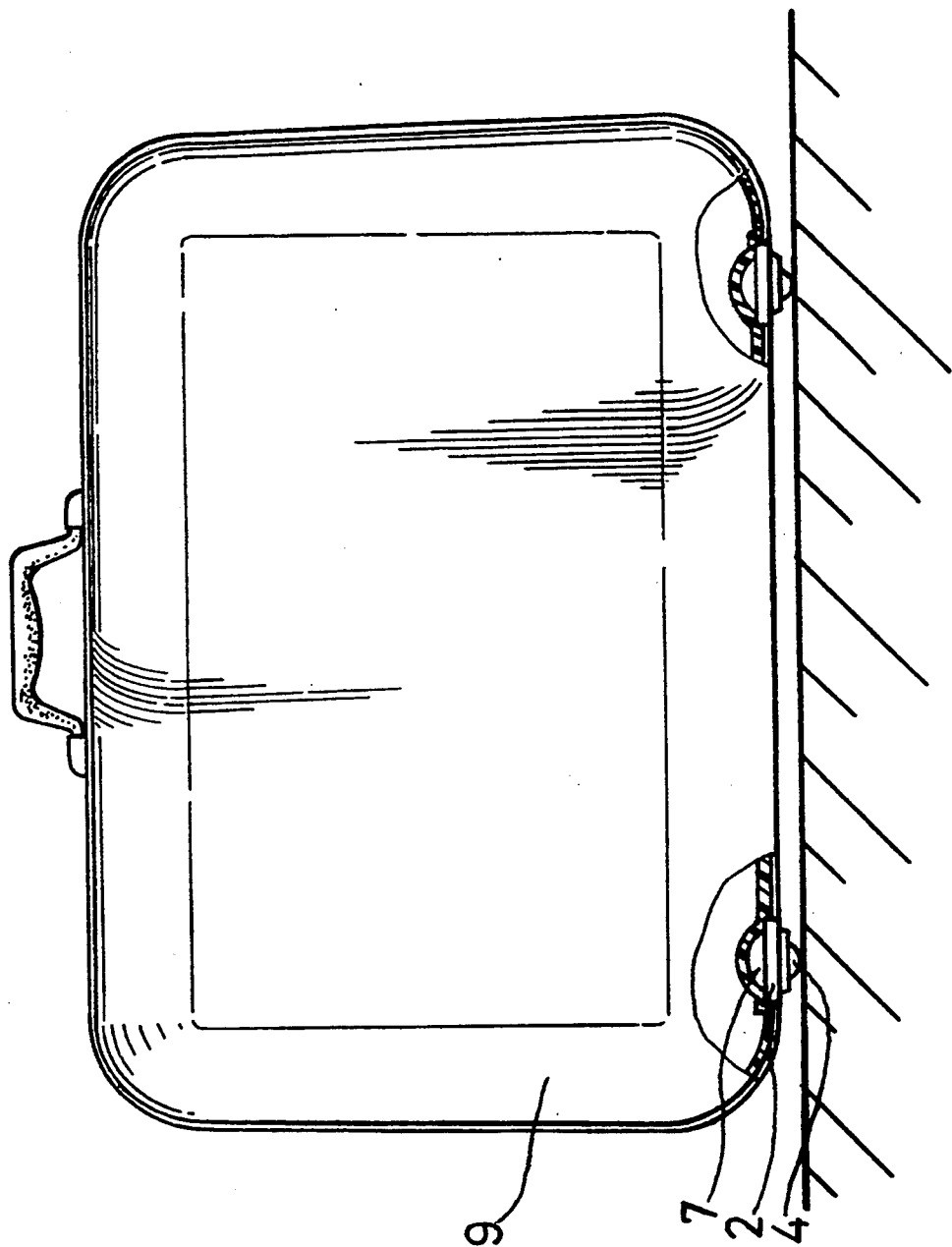
FIG. 5 is a perspective view of the casters applied on a piece of baggage of the present invention.
Figure 6:
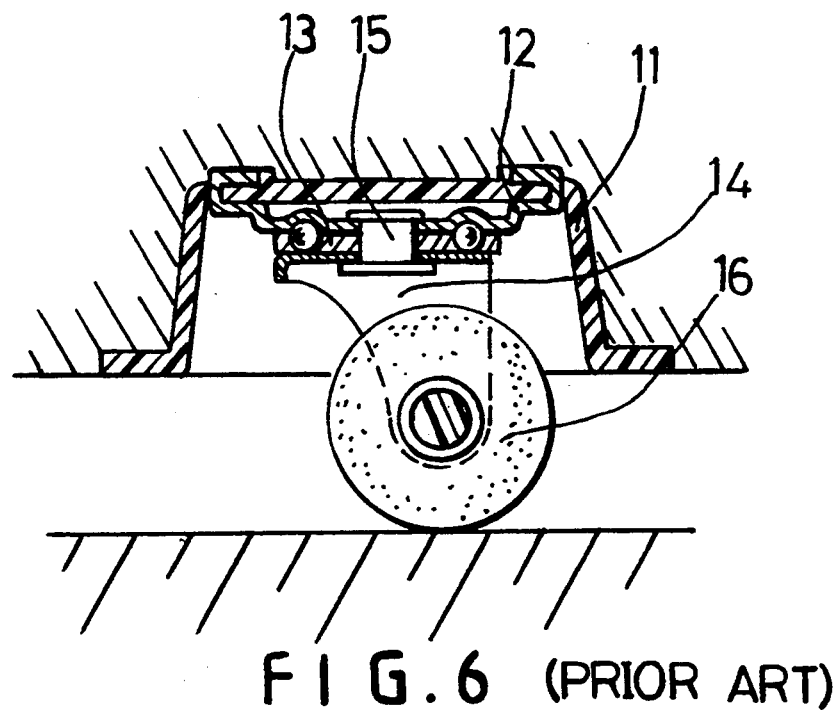
FIG. 6 is a cross-sectional view of a conventional caster for baggage.
Figure 7:
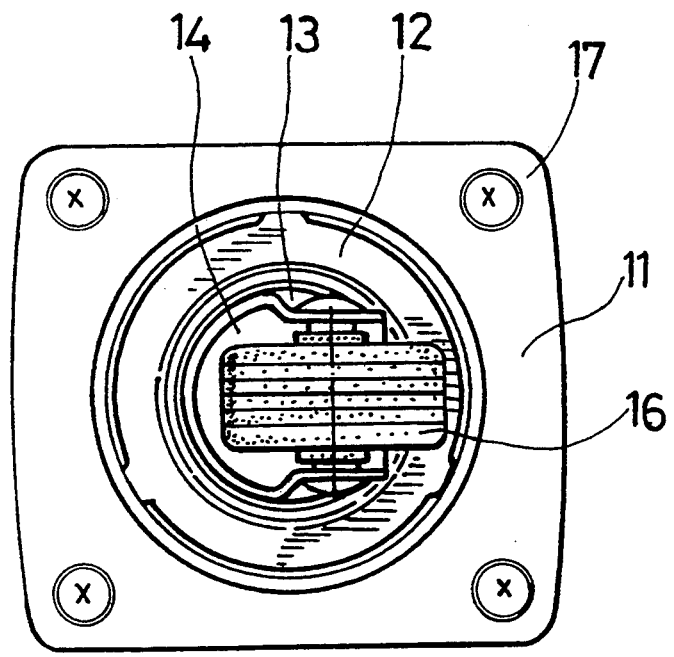
FIG. 7 is an upper cross-sectional view of the conventional caster for baggage.

In assembling the caster, as shown in FIGS. 2, 3 and 4, the lower fixing plate 2, the shaft 3, the ball 4, the bearing 5, the ring 6 and the upper fixing plate 7 are assembled together. The ball is then free to rotate about the shaft 3, as a pivot, on the ground, and the bearing 5, along with ball 4 are free to rotate through 360 degrees relative to the fixing plates 2, 7. The assembled caster can be fixed to the lower side of a piece of baggage, enabling the baggage to move smoothly on the ground.

The caster in the present invention may have the following advantages:

1. It has a rather large rolling ball pivotally sustained on a shaft, which is coupled to a bearing so that it can rotate through 360 degrees smoothly, not restrained by an uneven surface of the ground.
2. It can sustain a large weight in moving on the ground, while a conventional caster cannot.

While the preferred embodiment of the invention has been described above, it will be recognized and understood that various modifications may be made therein without departing from the spirit or scope of the invention as defined in the appended claims.

What is claimed is:

1. A caster for coupling to a bottom surface of baggage, comprising:

a. an upper fixing plate having a plurality of through bores formed therein for receiving a respective plurality of fasteners therethrough to couple said upper fixing plate to the bottom surface of baggage, said upper fixing plate having an annular recess formed in a lower surface thereof;

b. a lower fixing plate having a centrally disposed opening formed therethrough and a plurality of through bores formed therein and located in corresponding relationship to said through bores of said upper fixing plate, whereby the fasteners which secure said upper fixing plate to the bottom surface of baggage also respectively pass through said plurality of lower fixing plate through bores for coupling said lower fixing plate to said upper fixing plate;

c. a bearing rotatively secured between said upper and lower fixing plates, said bearing including (1) an annular body member having opposing upper and lower surfaces, said lower surface of said annular body member having a pair of diametrically opposed notches formed therein, (2) a plurality of small balls disposed in a plurality of respective recess openings formed in said annular body upper surface, and (3) a ring-shaped member having an arcuate cross-sectional contour overlying said plurality of small balls and disposed within said annular recess of said upper fixing plate;

d. a longitudinally extended shaft member, said shaft member having a pair of opposing ends respectively disposed in said pair of notches of said bearing body member; and, e. a ball member having a predetermined diameter, said ball member having at least a portion thereof extending through said central opening of said lower fixing plate and having a rotative axis defined by a through bore formed longitudinally therein for passage of said shaft member therethrough, said shaft member providing a pivotal coupling of said ball member to said bearing, said bearing providing for transverse rotative displacement of said rotative axis.

* * * * *